(12) United States Patent
deBotton et al.

(10) Patent No.: US 7,027,909 B2
(45) Date of Patent: Apr. 11, 2006

(54) UNIVERSAL DIAGNOSTIC METHOD AND SYSTEM FOR ENGINES

(75) Inventors: Gal deBotton, Ashkelon (IL); Eran Sher, Beer-Sheva (IL)

(73) Assignee: Engines PDM Ltd., Beer-Sheva (IL)

( * ) Notice: Subject to any disclaimer, the term of this patent is extended or adjusted under 35 U.S.C. 154(b) by 37 days.

(21) Appl. No.: 10/481,681

(22) PCT Filed: Jun. 19, 2002

(86) PCT No.: PCT/IL02/00487

§ 371 (c)(1),
(2), (4) Date: Jun. 29, 2004

(87) PCT Pub. No.: WO03/001175

PCT Pub. Date: Jan. 3, 2003

(65) Prior Publication Data

US 2004/0236494 A1    Nov. 25, 2004

(30) Foreign Application Priority Data

Jun. 26, 2001    (IL)    .................................... 144010

(51) Int. Cl.
*G01M 15/00*    (2006.01)
(52) U.S. Cl. .................................... 701/111; 73/119 A
(58) Field of Classification Search ............. 701/111, 701/115, 102; 73/119 A, 117.3
See application file for complete search history.

(56) References Cited

U.S. PATENT DOCUMENTS

| | | | |
|---|---|---|---|
| 3,783,681 A | 1/1974 | Hirt et al. ................. | 73/119 R |
| 4,488,240 A | 12/1984 | Kapadia et al. ............ | 364/508 |
| 5,226,500 A * | 7/1993 | Doi et al. .................... | 180/312 |

FOREIGN PATENT DOCUMENTS

| | | |
|---|---|---|
| DE | 41 23 030 | 9/1992 |
| EP | 245005 | 5/1989 |
| EP | 632261 | 1/1995 |
| EP | 1050863 | 11/2000 |

OTHER PUBLICATIONS

Nurhadi et al., Signature Analysis of 4-Stroke 1-Cylinder Engine, SAE technical paper 932011, 1993 (Society of Automobile Engineers, Warrendale, PA).

Autar et al., An Automated Diagnostic Expert System for Diesel Engines. J. Engineering for gas Turbines and Power, 1996, 118, pp. 673-679.

Macian et al., Condition Monitoring of Thermal Reciprocating Engines Through Analysis of Rolling Block Oscillations., SAE technical paper 980116, 1998 (Society of Automobile Engineers, Warrendale, PA).

(Continued)

*Primary Examiner*—Hieu T. Vo
(74) *Attorney, Agent, or Firm*—Marsteller & Associates, P.C.

(57) ABSTRACT

A method and system are provided for diagnosing the health-condition of engines, in particular internal combustion reciprocating engines, in which the harmonic terms of the Fourier series representation of the engine vibration are correlated with the mechanical state of the engine. In particular, the characteristics of the harmonic components of the Fourier representation are monitored at one or more predetermined frequencies according to at least one first predetermined criterion, and the characteristics of these harmonic components are analysed according to at least one second predetermined criterion to determine the operational state of the engine correlated to the second criterion.

34 Claims, 3 Drawing Sheets

OTHER PUBLICATIONS deBotton et al., Vibration Signature Analysis as a Fault Detection Method for SI Engines., SAE technical paper 980115, 1998 (Society of Automobile Engineers, Warrendale, PA).

* cited by examiner

UNIVERSAL DIAGNOSTIC METHOD AND SYSTEM FOR ENGINES

TECHNICAL FIELD

The present invention relates to a method and system for the diagnosing and monitoring the operational state of engines, specially of reciprocating engines and in particular of internal combustion reciprocating engines.

BACKGROUND

Reciprocating engines are widely used as a convenient means for converting chemical energy into motion. Several approaches have been proposed for diagnosing the state of health of such engines, and one of the most popular is by vibration analysis. Perhaps in its most basic form, an experienced maintenance technician or operator may often sense that something is wrong by the sound of an engine, aurally detecting undesirable vibrations. In certain circumstances, particularly with the more serious problems, he may even be able to isolate, or at least guess at the probable cause.

More sophisticated and much more sensitive techniques for monitoring the health of an engine involve the detecting of the vibrations generated in operation, usually by use of a suitable transducer, with signal analysis using suitable signal processing algorithms and processing hardware. The underlying concept is that every machine with moving parts will vibrate in response to the excitations employed on its components. Variations in the excitation forces, the machine's components or their interconnections will change the vibration pattern. Consequently periodic monitoring of the machine's vibration signature can provide useful information regarding its components and the excitations acting upon them.

A commonly used algorithm for analysing vibrations is the Fast Fourier Transformation (FFT). This numerical transformation enables the conversion of the vibration signals from the time domain to the frequency domain, and provides the magnitudes and phase angles of the harmonic terms comprising the vibration signals. It is known that a malfunction such as a misfiring cylinder will give rise to characteristic additional harmonic terms or will alter the relative intensities of existing terms, and, in principle, such disturbances can be used for diagnostic purposes. In practice, such diagnoses are not trivial however. Whereas FFT analysis of transducer output has been widely and successfully used for maintenance and monitoring purposes on rotating engines such as aero-engines [Eshleman 1995; Davies 1998; Kapadia N. S. et al. U.S. Pat. No. 4,488,240], it has proved much more difficult to identify faults in reciprocating-cylinder type engines, the vibration characteristics of which tend to be more complex.

Pioneering work in the diagnosis of reciprocating engine faults using vibration analysis includes the following. Nurhadi et al. [Nurhadi, I., Bagiasna, K. and Wediyanto. Signature Analysis of 4-Stroke 1-Cylinder Engine. SAE technical paper 932011, 1993 (Society of Automobile Engineers, Warrendale, Pa.)] were able to identify lubrication problems. Autar [Autar, R. K. An Automated Diagnostic Expert System for Diesel Engines. J. Engineering for Gas Turbines and Power, 1996, 118, pp. 673–679] describes a system that enables the detection of malfunctions such as cylinder compression and combustion faults, valve related faults and piston slap. Macian et al. [Macian, M., Lerma, M. J. and Barila, D. Condition Monitoring of Thermal Reciprocating Engines Through Analysis of Rolling Block Oscillations. SAE technical paper 980116, 1998 (Society of Automobile Engineers, Warrendale, Pa.)] also conclude that the vibration signature of the engine block can provide useful information regarding malfunctioning in one of the cylinders. Also, deBotton et al. [deBotton, G., Ben-Ari, J., Itzhaki, R. and Sher, E. Vibration Signature Analysis as a Fault Detection Method for SI Engines. SAE technical paper 980115, 1998 (Society of Automobile Engineers, Warrendale, Pa.). (also published in the 1998 SAE Transactions)] have demonstrated that the vibration signature of such engines can be used to identify the source of many malfunctions such as disconnected spark plug, narrow or wide spark plug gaps, early or late sparking, air leakage into the inlet manifold and loose engine support. Whereas all these problems result in additional vibrations that can be detected by a suitable transducer or other detection means, and resolved using FFT or similar algorithms, in real engines with localised malfunctioning, it has proved difficult to identify which cylinder is malfunctioning, and what type of fault is present. This is due to the complex nature of the reciprocating machines that incorporates a large number of moving parts. Using known methods results in the generation of complex waveforms which do not easily lend themselves to advanced universal root cause analyses schemes and thus require massive accompanying references data bases that need to be recorded for each individual type of engine.

In U.S. Pat. No. 5,633,456, a method is described for detecting cylinder misfiring and for identifying the corresponding cylinder. The method is based on sensing of the rotation of the crankshaft, comprising measurements of changes in the angular velocity of the crankshaft. Using a series of windows in the time domain the angular velocity is determined during the combustion in each of the cylinders in the engine. Then the velocity changes are determined by subtracting successive velocities. The method uses a specific filter to determine the occurrence of a misfire in a specific cylinder and a high-pass and low-pass filters to reduce the amount of noise associated with other sources of vibrations in the engine. Due to the complexity that arises from the necessity to analyse the waveform, the system must be carefully adjusted to each engine type.

In U.S. Pat. No. 3,783,681 a number of individual transducers are used to sense engine vibration, each transducer being connected to a different one of the cylinders that comprise the engine. The vibration data is used to assess the mechanical integrity of the cylinder, primarily surface and other erosion related faults that might lead to a failure, to increased fuel consumption etc. As all cylinders within an engine are situated within the cylinder block, in such a design, vibrations will be picked up from all cylinders, not just from the one ostensibly being monitored. This patent is directed to some technical issues and not on the concept of how to analyse and correlate the measured data.

In EP 245005, measurements of angular velocity oscillations of the crankshaft are carried out with an optical encoder—these oscillations are referred to as torsional vibrations. The waveform is transformed to the frequency domain where both amplitude and phase angle are determined at orders of the crankshaft revolution frequency. A method is applied to analyze the torsional vibrations at the first harmonic order (accounting for both amplitude and phase) in order to obtain the required correction in fuel supply for each cylinder. However, for a complete diagnosis of the engine and for the disordered cylinder to be uniquely identified this method requires a database for the specific engine tested to have been previously compiled.

None of the above references provide a universal systematic method which is applicable for large numbers of engine, and in any case generally rely on comparison of the results obtained with a pre-acquired reference data base.

There is therefore a need for, and it is thus an aim of the present invention to provide, a method and system for monitoring the health-condition of an engine that overcomes the limitations of previously known methods and systems, in particular, such a method and system that is more sensitive and informative than known methods and systems.

It is another aim of the present invention to provide such a method and system for detecting a state of imbalance existing between the various cylinders of an internal combustion engine.

It is another aim of the present invention to provide such a method and system to enable the identification of a cylinder of a reciprocating engine which has or is developing a fault.

It is another aim of the present invention to provide such a method and system that enables the distinguishing between cases in which the operation of a disordered cylinder, typically the combustion process therein, is stronger or weaker than in the other cylinders.

It is a further aim of the invention to provide such a method and system for analysing and identifying the type of malfunction in the disordered cylinder.

It is a further aim of the present invention to provide such a system or method that requires the use of vibration sensing means situated in one location only on the engine, or alternatively a plurality of sensing means situated at different locations on the engine.

It is a further aim of the present invention to provide such a system or method in which engine monitoring may be accomplished while the engine is running under normal velocities and loads.

It is a further aim of the present invention to provide such a system or method wherein no substantial interference with the regular operation of the engine is required.

It is a further aim of the present invention to provide such a system or method wherein such monitoring may be accomplished without contact with the moving parts of the engine.

It is a further aim of the present invention to provide such a system or method such as to enable on-line real-time control of engine parameters such as fuel consumption rate, ignition timing, fuel injection timing, so as to correct or avoid an imbalanced state of operation.

It is a further aim of the present invention to provide such a system or method that may be successfully applied optionally without the need for referencing a previously compiled reference database.

It is a further aim of the present invention to provide such a system or method that may be universally applied to virtually any piston machine, including reciprocating or rotary engines, and in particular to internal combustion reciprocating engines, including diesel or spark-induced engines.

It is a further aim of the present invention to provide such a system or method for root cause analysis of faults, relating certain terms of a Fourier series expansion of a vibration waveform with an imbalanced state of operation of a reciprocating, and in particular internal combustion reciprocating engine.

As will become clear from the description and examples disclosed herein, the present invention achieves these and other aims by providing a method and system for diagnosing the health-condition of engines, in particular internal combustion reciprocating engines, that correlates the harmonic terms of the Fourier series representation of the engine vibration with the mechanical state of the engine. In particular, the characteristics of the harmonic components of the Fourier representation are monitored at one or more predetermined frequencies according to at least one first predetermined criterion, and the characteristics of these harmonic components are analysed according to at least one second predetermined criterion to determine the operational state of the engine correlated to said second criterion.

In DE4123030, the signal spectrum of the tested engine is provided and separated according to complete engine cycles. This is determined by measuring the force on a piezo element as a function of time. The measured force vs. time plot is subdivided such as to enable the measured force during complete engine cycles and relating to individual cylinder signals to be studied, and this is compared with the results obtained in the same way at equal loading and speed conditions for an internal combustion engine that was found empirically to be good. On the basis of this comparison, typically using standard deviation methods, it can be determined, according to the patent, whether the test engine operates within tolerable limits or not. Thus, there is no transformation of the vibration data into the frequency domain, less so any disclosure or suggestion of the analysis of such data according to the present invention.

EP 632261 is directed to detection of an abnormal resonant frequency to indicate that one or more cylinders is operating at an improper power level. Vibration signals from each cylinder (measured by individual transducers for each cylinder) are used to perform FFT analysis, and an average resonant frequency for each cylinder is obtained over a few engine cycles. Shifts in the averaged resonant frequency or a zero resonant frequency for only one of the cylinders is used as an indication that such a cylinder is experiencing a low power condition, such as misfiring. Thus, particular peak values of amplitudes are used to provide sought-after frequencies, and thus this patent neither discloses nor suggests the present invention.

EP 1050863 is concerned with tachometers for use in analysis work on engines, and in particular for providing rpm from vibration signatures of the engine. The vibration signature of an engine is determined as a power spectral density (PSD) plot, and the first three frequencies at which peak amplitudes occur are determined. These frequencies are theoretically multiples of the dominant frequency f, which is mathematically related to engine rpm. Thus, by knowing the type of engine, and thus the relationship between the multiples of f, and by determining f from the PSD plot, the engine rpm is determined. Therefore in this patent, what are actually being monitored are harmonics having characteristics according to very specific conditions, i.e., the harmonics having the three highest amplitude peaks, and then the frequencies at which this happens are provided. In this patent there is no actual monitoring at all at predetermined frequencies, since it is precisely the values of frequencies that are being sought in order to calculate the rpm, and are therefore not "predetermined". In other words, a very specific set harmonics is being monitored in order to provide the sought-after frequencies. In contrast, in the present invention, a criterion is applied to the monitoring frequencies in order to find particular harmonics.

Also according to the patent, the location and identification of additional peaks enables identification of faults. Essentially, the frequencies at which the highest peaks are obtained are analysed, and the relative values of these frequencies are compared to the relative values that should be obtained for the type of engine (i.e., the theoretical multiples of f) to see if there is a malfunction. In other words, the frequencies obtained at particular harmonics (the harmonics having highest magnitudes) are analysed, in contrast to the present invention in which it is the characteristics of harmonics that are analysed at particular frequencies, and even at a single frequency. Furthermore, in this patent this analysis cannot be conducted at just one frequency, since an isolated peak without reference to the other two peaks is meaningless for providing multiples of f.

SUMMARY OF INVENTION

The present invention is directed to a method for diagnosing an operational state of an engine comprising the steps of:
(a) providing vibration data from the engine, said data synchronised with respect to the thermo-mechanical cycle of the engine;
(b) transforming the synchronised vibration data in (a) into the frequency domain to obtain a Fourier representation of the vibration produced by the engine;
(c) monitoring the characteristics of the harmonic components of the Fourier representation at one or more predetermined frequencies according to one or more first predetermined criteria;
(d) analysing the characteristics of the harmonic components obtained in step (c) according to one or more second predetermined criteria to determine the operational state of the engine correlated to said second criteria.

According to a first aspect of the invention, the operational state of the engine correlated to said second predetermined criteria relates to determining whether or nor an imbalance exists in a cylinder of said engine, wherein step (c) comprises:
(e) monitoring the magnitudes of harmonic components of the Fourier representation at least at one frequency of a first set of monitoring frequencies which is not at any one of the orders of the combustion frequency of the engine;

and wherein step (d) comprises
(f) determining whether or not an imbalance exists between the cylinders according to whether the magnitude of the harmonic components obtained in (e) exceeds or not, respectively, at least one predetermined threshold.

Step (a) of the method typically comprises the substeps:
(i) monitoring the vibration of the engine;
(ii) monitoring the revolution angle of the engine; and
(iii) synchronising the vibration waveform of (i) with respect to the revolution angle obtained in (ii).

Substep (i) may be accomplished by means of a suitable vibration transducer operatively connected to the said engine. The revolution angle may be determined by means of a second, triggering transducer, operatively connected to the crankshaft of said engine. Step (b) of the method may be accomplished by applying a Fast Fourier Transform (FFT) analysis to the vibration data obtained in step (a).

The combustion frequency may be determined from the expression:

$$f_c = N_c k f_F$$

wherein:
$k=\frac{1}{2}$ for four-stroke engines and $k=1$ for two-stroke engines;
$N_c$ is the number of cylinders in the engine; and
$f_F$ is the revolution frequency of the engine.

The threshold is in the range of between about 1% and 4% of the magnitude of the corresponding harmonic components of the Fourier representation at any order of the combustion frequency of the engine, and in particular the threshold is in the range of between about 1% and 4% of the magnitude of the of the corresponding harmonic components of the Fourier representation at the combustion frequency of the engine.

According to a second aspect of the present invention, the operational state of the engine correlated to said second predetermined criteria relates to identifying an unbalanced cylinder of said engine, wherein step (C) comprises:
(A) monitoring the phase angles of harmonic components at least at one first diagnosing frequency, $f^D_n$, such that the phase angle of the different cylinders provided thereby;

and step (d) comprises:
(B) providing, for each cylinder of the engine, at least one first theoretical absolute phase angle corresponding to said at least one harmonic component of step (A) based on a Fourier representation of unbalanced engine vibration; and
(C) determining which is the unbalanced cylinder according to which of the cylinders provides results in step (B) that most closely matches the phase angle obtained in step (A).

Optionally, the engine comprises an odd number of cylinders, and wherein in step (B) further comprises providing for each said cylinder a second theoretical absolute phase angle corresponding to said at least one harmonic component of step (A), wherein each said second absolute phase angle is equal to the sum of the corresponding first absolute phase angle and $\pi$ radians. It may be determined whether the unbalanced cylinder is operating at a stronger or weaker level than the other cylinders according to whether the determination of step (C) is provided from results obtained at the said first absolute phase angles or at the said second absolute phase angles.

Optionally, it is known that the unbalanced cylinder is operating at a stronger level than the other cylinders in the engine.

Optionally, the said engine comprises an even number of cylinders, and wherein it is known that the unbalanced cylinder is operating at a weaker level than the other cylinders in the engine, and wherein step (B) further comprises adding the value of $\pi$ radians to each said first theoretical absolute phase angle corresponding to said at least one harmonic component of step (A), prior to executing step (C).

Alternatively, the operational state of the engine correlated to said second predetermined criteria relates to identifying an unbalanced cylinder of said engine, wherein step (c) comprises
(A) monitoring the phase angles of harmonic components at least at one first diagnosing frequency, $f^D_n$, such that the phase angle of the different cylinders provided thereby; and
(D) monitoring the phase angles of harmonic components at least at one second diagnosing frequency, $f^{\tilde{D}}_n$, such that the phase angle of each cylinder of the engine depends on whether the combustion process in one of the cylinders of a pair of opposing cylinders is stronger or weaker than in the other cylinders;

and step (d) comprises:
(B) providing, for each cylinder of the engine, a first theoretical absolute phase angle corresponding to said at least one harmonic component of step (A) based on a Fourier representation of unbalanced engine vibration, and a second theoretical absolute phase angle corresponding to said at least one harmonic component of step (A), wherein each said second absolute phase angle is equal to the sum of the corresponding first absolute phase angle and π radians;

(E) providing, for each cylinder of the engine, at least one first theoretical absolute phase angle corresponding to said at least one harmonic component of step (D) based on a Fourier representation of unbalanced engine vibration, and a second theoretical absolute phase angle corresponding to said at least one harmonic component of step (D), wherein each said second absolute phase angle is equal to the sum of the corresponding first absolute phase angle and π radians; and (F) determining which is the unbalanced cylinder according to which of the cylinders provides results in step (A) and step (B) that most closely matches the phase angle obtained in step (D) and step (E), respectively.

The at least one frequency of a first set of diagnosing frequencies $f_n^D$, may be determined from the expression:

$$f_n^D = (mN_c \pm 1)kf_F$$

wherein:
m is a positive integer
k=½ for four-stroke engines and k=1 for two-stroke engines;
$N_c$ is the number of cylinders in the engine; and
$f_F$ is the revolution frequency of the engine.

The at least one frequency of a second set of diagnosing frequencies, $f_n^P$, may given be determined from the expression:

$$f_n^P = (mN_c \pm 2)kf_F$$

wherein:
m is a positive integer
k=½ for four-stroke engines and k=1 for two-stroke engines;
$N_c$ is the number of cylinders in the engine; and
$f_F$ is the revolution frequency of the engine.

The absolute phase angle $\phi_n^M$ for the M-th cylinder may be determined in step (B) via the expression:

$$\phi_n^M = \phi_n - 2n\pi\left(\frac{M-1}{N_c}\right).$$

wherein:
n is the order corresponding to the harmonic in step (A);
$N_c$ is the number of cylinders in the engine;
M=1, 2, ..., $N_c$;
$\phi_n$ is the phase angle at the n'th term in the Fourier series representation.

The absolute phase angle $\phi_n^M$ for the M-th cylinder may be determined in step (E) via the expression:

$$\phi_n^M = \phi_n - 2n\pi\left(\frac{M-1}{N_c}\right) + \pi.$$

wherein:
n is the order corresponding to the harmonic in step (A);
$N_c$ is the number of cylinders in the engine;
M=1, 2, ..., $N_c$;
$\phi_n$ is the phase angle at the n'th term in the Fourier series representation.

The phase angle at the n'th term, $\phi_n$, may be provided by the expression $$\phi_n = nk(\phi_c/2).$$

wherein:
n is the order corresponding to the harmonic in step (A);
k=½ for four-stroke engines and k=1 for two-stroke engines;
$\phi_c$ is the phase angle of the harmonic term at the combustion frequency.

Optionally, the predetermined criteria further relates to determining whether the combustion process in the unbalanced cylinder is stronger or weaker than the combustion process in other cylinders of the engine, further comprising the step (G) determining whether the combustion process in the unbalanced cylinder is stronger or weaker than in the other cylinders, according to whether the closest match in step (F) corresponds to a corresponding said first absolute angle or a corresponding second absolute angle in each one of steps (D) and (E).

In step (B), for each of the cylinders of the engine, the theoretical absolute phase angles corresponding to a plurality of harmonic components of step (A) based on a Fourier representation of unbalanced engine vibration may be determined, and the resulting set of absolute phase angles corresponding to each of the cylinders may be operated on via a mathematical operation to provide a representative absolute phase angle for each corresponding cylinder. Preferably, the mathematical operation comprises for each cylinder performing a root mean square operation on the corresponding set of phase angles.

In step (E), for each of the cylinders of the engine, the theoretical absolute phase angles corresponding to a plurality of harmonic components of step (A) based on a Fourier representation of unbalanced engine vibration may be determined, and wherein the resulting set of absolute phase angles corresponding to each cylinder is operated on via a mathematical operation to provide a representative absolute phase angle for each corresponding cylinder. Preferably, the mathematical operation comprises for each cylinder performing a root mean square operation on the corresponding set of phase angles.

Typically, the engine is an internal combustion engine. Optionally, a plurality of thresholds are provided in the form of an accessible reference library. Preferably, each one of said plurality of thresholds corresponds to a particular root cause for unbalanced engine operation.

The present invention is also directed to a corresponding system for diagnosing the operational state of an engine comprising:
(a) measuring means for measuring a vibration signature of the engine generated by the engine with respect to the thermo-mechanical cycle of the engine;
(b) data processing means adapted for
  (i) transforming the vibration data in (a), after normalisation thereof with respect to the thermo-mechanical cycle of the engine, into the frequency domain to obtain a Fourier representation of the vibration produced by the engine;
  (ii) for monitoring the characteristics of the harmonic components of the Fourier representation at predetermined monitoring frequencies according to predetermined criteria; and
  (iii) for comparing the characteristics of the harmonic components obtained in step (ii) with said predetermined criteria to determine the operational state of the engine correlated to said criteria.

Preferably, the functions listed in step (b) are performed according to the method of the invention. Preferably, the measuring means comprises at least one suitable vibration sensor for measuring the said vibration signature of the engine, and at least one triggering sensor for providing corresponding data relating to the thermo-mechanical cycle of the engine. Typically, the data processing means comprises a suitable microprocessor computer operatively connected to said measuring means. Preferably, the system, and in particular the data processing means, further comprises suitable display means operatively connected to said data processing means for displaying the state of health of the engine determined by said data processing means.

DESCRIPTION

Figure 1:
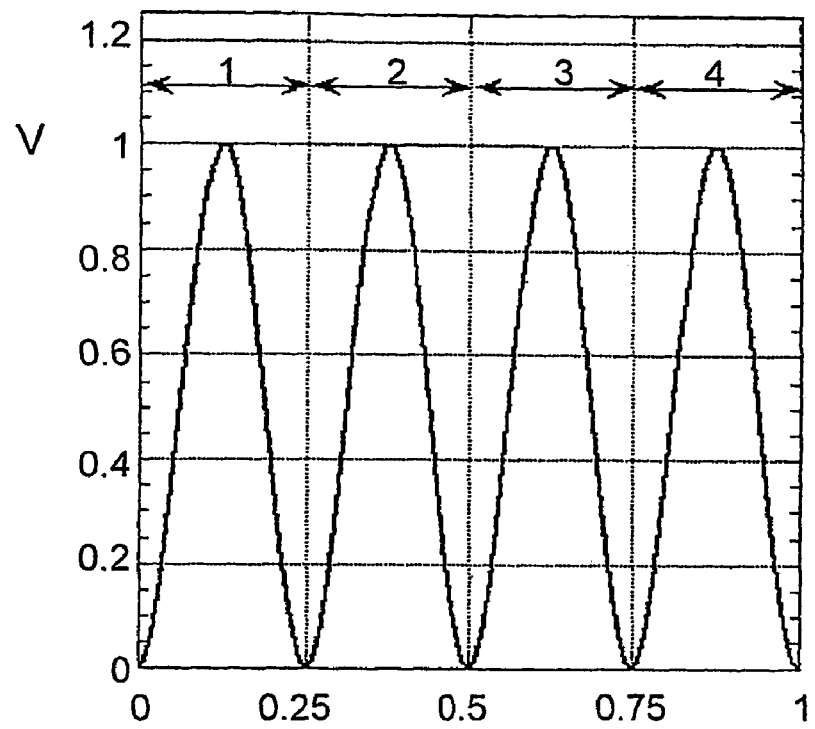
FIG. 1 shows schematically a typical vibration waveform that may be obtained with a healthy engine as a function of the thermo-mechanical cycle of the engine, wherein v is the vibration amplitude and z is an independent variable.

The present invention is defined by the claims, the contents of which are to be read as included within the disclosure of the specification, and will now be described by way of example with reference to the accompanying Figures.

All examples are given by way of clarification, and are not to be construed as being comprehensive, or in any other way limiting.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The present invention relates to a method for detecting the health condition, i.e., the operational state, of piston machines, in particular of internal combustion (IC) engines, including reciprocating engines and rotary engines. The method is in particular directed at providing experimentally obtained values of predetermined parameters in the frequency domain related to engine vibration, and using these values together with theoretically derived relationships between such parameters and other predetermined parameters to determine various states of the engine wherein malfunctions are occurring in one cylinder thereof.

The following analysis provides an outline in which the aforesaid theoretical relationships are derived. While the analysis is directed at in-line arrangement of cylinders in an internal combustion engine, it also applied, mutatis mutandis, to all other types of cyclic engines, in particular reciprocating engines, and especially to piston engines including radial, V-, opposed and other types of piston arrangements. The anaylsis relates to a typical internal combustion (IC) engines, having a number of cylinders mechanically coupled typically via a crankshaft. In the analysis, the basic measuring unit used is the duration of the thermo-mechanical cycle of the engine $T_h$, rather than simple elapsed time. For a given type of thermo-mechanical process this measuring unit can be identified with the angular displacement of the crankshaft from a datum, the displacement commonly referred to herein as the crankshaft angle. Thus, in four-stroke engines this basic unit is equivalent to two revolutions of the crankshaft ($4\pi$ radians) and in two-stroke engines it is equivalent to a single crankshaft revolution ($2\pi$ radians). Only when the engine is operating at a constant angular speed the waveform of the vibration thus generated may be regarded as periodic having a time-period that is equal to the period of the thermo-mechanical cycle.

For the sake of clarity common terms which are frequently being used in time domain analyses will be adopted and used with the understanding that the independent "time" variable is measured in terms of thermo-mechanical cycles or the angle of the crankshaft. In particular, the term frequency will denote the number of occurrences of an event during the thermo-mechanical process cycle. Accordingly, if the engine consists of $N_c$ cylinders with distinct combustion timing the combustion frequency is $f_c=N_c/T_h$. The revolution frequencies of four-stroke and two-stroke engines are, respectively, $f_F=2/T_h$ and $f_F=1/T_h$.

The function describing the vibration of an ideal $N_c$-cylinder IC engine (including spark ignition or diesel engines) which is operating under normal conditions is periodic, having a period $T_c$, given by $$T_c=1/f_c=T_h/N_c \tag{A1}$$

This results from the fact that the primary vibration excitation in IC engines is the combustion process occurring once in each cylinder during a complete thermo-mechanical cycle of the engine, and hence $N_c$ times for the engine as a whole during each cycle. An illustrative sketch of a waveform h(z) (normalized to unity) of a 4-cylinder engine that satisfies the periodicity relation $h(z+T_c)=h(z)$ is shown in FIG. 1. It is noted that the order in which the peaks are sequenced in the waveform is in the combustion order, and not the spatial order of the cylinders in the engine block. The four peaks that appear in FIG. 1 are associated with the combustion processes in each of the cylinders. Clearly, the Fourier series representation of the ideal engine vibration waveform will include harmonic terms at the combustion frequency and at its orders.

When one of the cylinders is malfunctioning in some way, and thus not operating orderly with respect to the other cylinders, a state of imbalance between the cylinders occurs. Such malfunctions generally have an immediate effect on the combustion process in that cylinder and hence generates a disturbance in the original ideal vibration waveform. The disturbance may appear as an increase or a decrease in the magnitude of the oscillation associated with the combustion process in this cylinder, as a variation of the waveform contour or profile, or usually as a combination of both. Regardless of the precise form of the disturbance, due to the unbalanced state of operation, the fundamental period of the vibration waveform increases from $T_c$ to $T_h$. Accordingly, the periodicity condition of the disturbed waveform, Wh, becomes $Wh(z+T_h)=Wh(z)$.

In a mechanically uncoupled engine, that is in an imaginary engine in which each of the cylinders is mechanically independent from the other cylinders, for example by having its own individual crankshaft, the parts of the vibration waveform associated with the remaining ($N_c-1$) orderly operating cylinders would remain unchanged. In practice, since the cylinders of an engine are in general mechanically coupled, it is anticipated that the vibration waveform associated with the combustion processes in the other remaining ($N_c-1$) cylinders will slightly deviate from their normal contour. An illustrative sketch of a waveform of a 4-cylinders engine with a malfunctioning or disordered fourth cylinder is shown in FIG. 2.

Figure 2:
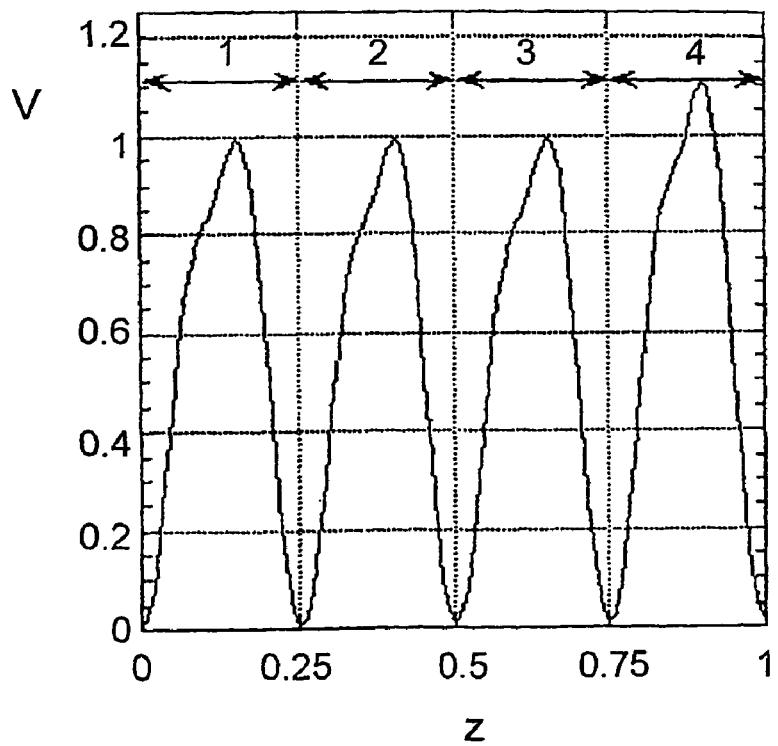
FIG. 2 shows schematically a vibration waveform that may be obtained with an engine having a malfunctioning cylinder as a function of the thermo-mechanical cycle of the engine, wherein v is the vibration amplitude and z is an independent variable.
Figure 3:
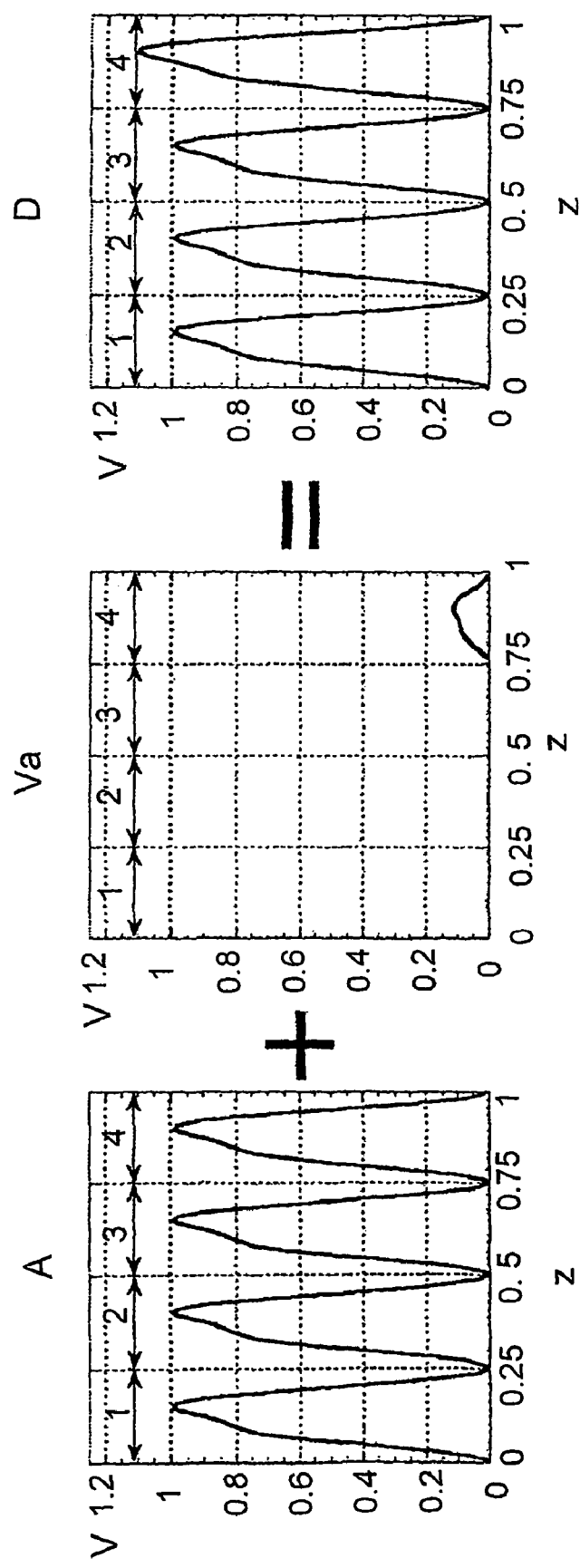
FIG. 3 shows the decomposition of the waveform of FIG. 2 into a sum of an artificial waveform of period $T_c$ and a variance waveform of period $T_h$, wherein v is the vibration amplitude, A is an artificial waveform, Va is a variance and D is a resulting disturbed waveform.

An artificial waveform with a period $T_c$, similar to that of the engine with no malfunction, can be constructed by replacing, in the disturbed waveform of FIG. 2, the section associated with the disordered cylinder with that of an orderly operating cylinder. A variance waveform may be obtained by subtracting the artificially constructed waveform from the disturbed waveform for the malfunctioning cylinder. This variance waveform consists of a single peak that characterizes the differences in the vibration signature resulting from the improper combustion at the malfunctioning cylinder. Thus, the disturbed waveform of the engine can be viewed as the sum between the artificially constructed waveform, and the variance waveform. This decomposition of the disturbed waveform is illustrated in FIG. 3 where, as before, the fourth cylinder is malfunctioning.

In view of the linearity of the Fourier transform a similar decomposition can be carried out in the frequency domain. Thus, the Fourier series representation of the disturbed waveform can be regarded as the sum of the corresponding Fourier series representations of the artificial idealised waveform and the variance waveform. The artificially constructed idealised waveform has a period of $T_c$ and accordingly its Fourier series representation will consist of harmonic terms only at orders of the combustion frequency $f_c=N_c/T_h$. Thus, all of the harmonic terms of the Fourier series of the disturbed waveform at frequencies $N/T_h$ where $N$ is an integer which is not an integer multiple of $N_c$ are essentially identical to the corresponding terms of the Fourier series of the variance waveform.

The above analysis of the frequency domain decomposition suggests that the harmonic terms of a Fourier series of a vibration signature at frequencies which are not at orders of the combustion frequency provide an indication for an imbalance between the cylinders.

Let $v^{(1)}(z)$ be a periodic function with a period $T_h$ that describes the variance waveform due to a malfunction in a cylinder whose combustion process is the first one in a combustion sequence of the engine. The Fourier series representation of this function is $$v_F^{(1)}(z) = \frac{a_o}{2} + \sum_{n=1}^{\infty} \left[ a_n \cos\left(2n\pi \frac{z}{T_h}\right) + b_n \sin\left(2n\pi \frac{z}{T_h}\right) \right], \quad (A2)$$

where $$a_n = \frac{2}{T_h} \int_0^{T_h} v^{(1)}(z) \cos\left(2n\pi \frac{z}{T_h}\right) dz, \quad (A3)$$

and $$b_n = \frac{2}{T_h} \int_0^{T_h} v^{(1)}(z) \sin\left(2n\pi \frac{z}{T_h}\right) dz. \quad (A4)$$

It is noted that $v^{(1)}(z) \neq 0$ only in an interval of length $T_c$ that corresponds to the section of $T_h$ where the combustion in the first cylinder take place.

Similar malfunctions that may occur in any of the other cylinders will result in an identical variance waveform which is shifted by an interval of $\Delta z=(M-1)T_c$ where M, an integer between 1 and $N_c$, specifies the sequential position of the cylinder in the combustion order. Note that the case of M=1 corresponds to a zero shift of the phase angle, that is, to the first cylinder in the combustion order. Accounting for the relation $T_h=N_cT_c$, the Fourier series representation of the shifted variance waveform is $$v_F^{(M)}(z) = \frac{a_o}{2} + \sum_{n=1}^{\infty} \left[ a_n \cos\left(2n\pi \frac{z-\Delta z}{T_h}\right) + b_n \sin\left(2n\pi \frac{z-\Delta z}{T_h}\right) \right] \quad (A5)$$

$$= \frac{a_o}{2} + \sum_{n=1}^{\infty} \left[ a_n \cos\left(2n\pi \frac{z}{T_h} - 2n\pi \frac{M-1}{N_c}\right) + b_n \sin\left(2n\pi \frac{z}{T_h} - 2n\pi \frac{M-1}{N_c}\right) \right],$$

where the coefficients $a_n$ and $b_n$ are identical to the ones determined for the first cylinder. The appearance of harmonic terms at frequencies which are not integer multiples of the combustion frequency indicates an imbalanced state of operation for the engine. The magnitude of these harmonic terms can provide an indication regarding the severity of the imbalance and possibly to its source. The total R.M.S. amplitude of these harmonic components, i.e., the harmonic terms at frequencies that not at integer multiples of the combustion frequency, may be, say, approximately 90% of the total R.M.S. magnitude of the disturbed waveform. Accordingly, it is expected that the total R.M.S. magnitude of these components will be of the same order of magnitude as the disturbance. Further, since the Fourier series representation of the disturbed waveform is similar in form to a short pulse in the time domain, the magnitudes of the first few terms are almost equal, and thus the magnitude of each of these few terms will tend to be of the same order as of the disturbance itself. Said differently, a single pulse in the time domain, for example as illustrated in FIG. 3, transform to a "flat" pulse in the frequency domain, regardless of the precise shape of the pulse, i.e., the magnitudes of the first terms of the corresponding Fourier series representation are almost identical one with another. In other words, there is no predominant harmonic term, or pair of terms, that can characterise the pulse: rather, a large number of approximately equal terms are required, and thus the magnitude of these terms are of the same order as that of the pulse itself.

The above analysis also facilitates the identification of the malfunctioning or disordered cylinder. First it is noted that the phase angle shift at the first order term of the Fourier series expansion (n=1 in equation (A5)) is $$-2\pi \frac{M-1}{N_c}, \quad (A6)$$

and hence for any two successive cylinders in the thermomechanical cycle, the phase angle of the first order term will be shifted by $-2\pi/N_c$ radians. Thus, the phase angle of the first order term in the Fourier series, generated from the waveform obtained from a malfunctioning engine, indicates which of the cylinders of that engine is the source for the imbalance between the cylinders.

Moreover, at any n-th order term of the Fourier series, where $$n = mN_c \pm 1, \quad (A7)$$

with m integer, the phase angle shift will be $$-2\pi(mN_c \pm 1)\frac{M-1}{N_c} = -2\pi m(M-1) \mp 2\pi \frac{M-1}{N_c} \Rightarrow \mp 2\pi \frac{M-1}{N_c}, \quad (A8)$$

resulting once again with a phase angle shift of $\mp 2\pi/N_c$ radians between two consecutive cylinders. In fact, the phase angle shifts at the higher order terms (m=1,2, ...) typically provide more reliable information than the one derived from the first order term (m=0). This is because the low frequency range of a vibration waveform of a real engine usually contains a great deal of background noise resulting from various engine components that operate at this frequency range (e.g. the camshaft or crankshaft).

The malfunctioning or disordered combustion process in a particular cylinder may be either stronger or weaker relative to the processes that are occurring in the other cylinders of the engine. For example, a stronger combustion process might result from a worn fuel injector that allows too large amount of fuel to flow into the cylinder or due to incorrect timing of an inlet valve. A weaker combustion process may result, for example, from a partially blocked injector or worn piston rings.

Depending on the relative magnitude of the combustion process in the disordered cylinder the variance waveform will be positive or negative. This will lead to a π radians phase angle shift between these two situations. For a negative variance waveform the shift of the phase angle at the $n = mN_c \pm 1$ term is given by $$-2\pi(mN_c \pm 1)\frac{M-1}{N_c} + \pi \Rightarrow \mp 2\pi \frac{M-1}{N_c} + \pi = 2\pi\left(\frac{\frac{1}{2}N_c \mp (M-1)}{N_c}\right). \quad (A9)$$

In engines with an even number of cylinders this might lead to some confusion because at these terms of the series the phase angle shift of the $M \pm N_c/2$ cylinder (the cylinder whose combustion processes occurs half a thermo-mechanical cycle after the M-th one, denoted herein as the "opposing" cylinder with respect thereto) with a negative variance waveform is $$-2\pi(mN_c \pm 1)\frac{(M-1) \pm \frac{1}{2}N_c}{N_c} + \pi = \mp\pi mN_c \mp \quad (A10)$$

$$2\pi\left(\frac{(M-1) \pm \frac{1}{2}N_c \mp \frac{1}{2}N_c}{N_c}\right)$$

$$= \mp\pi mN_c \mp 2\pi\frac{(M-1)}{N_c}$$

$$\Rightarrow \mp 2\pi\frac{(M-1)}{N_c}.$$

which is therefore identical to the phase angle shift of the M-th cylinder with a positive variance waveform.

This ambiguity can be resolved by applying a few methods. First it is noted that a distinction between these two cases can be accomplished by looking at the $n = mN_c \pm 2$ terms of the Fourier series. At these terms the phase angle of an M-th cylinder with a positive variance waveform is shifted by $$-2\pi(mN_c \pm 2)\frac{M-1}{N_c} = -2\pi m(M-1) \mp 2\pi\frac{M-1}{N_c/2} \Rightarrow \mp 2\pi\frac{(M-1)}{N_c/2}. \quad (A11)$$

The phase angle shift of the $M \pm N_c/2$ cylinder with a positive variance waveform, is $$-2\pi(mN_c \pm 2)\frac{(M-1 \pm N_c/2)}{N_c} = \left[-2\pi m(M-1 \pm N_c/2) \mp \right. \quad (A12)$$

$$\left. 2\pi\frac{(M-1)}{N_c/2} \mp 2\pi\right]$$

$$\Rightarrow \mp 2\pi\frac{(M-1)}{N_c/2},$$

which is identical to the phase angle shift for the M-th cylinder with a positive variance waveform. On the other hand, for both the M and the $M \pm N_c/2$ cylinders with a negative variance waveform the corresponding phase angle will be shifted by π radians relative to the case of a positive variance waveform. Thus, the phase angles at orders $mN_c \pm 2$ can provide the required additional information that enables to distinguish between these two cases. This also provides information regarding the type of malfunction that occur in the disordered cylinder (e.g. whether the combustion in that particular cylinder is stronger or weaker than the ones occurring in the other cylinders).

A second method, which is applicable while the engine is not being used, is to test the engine by halting the combustion process in one of the two questionable cylinders (by disconnecting the spark plug or halting the fuel flow) and to determine the phase angle shifts at the $mN_c \pm 2$ terms. Clearly, under these conditions the combustion in this cylinder is weaker than the ones in the rest of the cylinders. If the phase angle shifts are the same as those measured during the first measurement it is concluded that the type of the problem is a weak combustion in the M-th cylinder. If, on the other hand, the phase angles are shifted by π radians it is concluded that the imbalance results from too strong combustion in the $M \pm N_c/2$ cylinder. In essence, this second method corresponds to an instantaneous construction of a temporary reference data base. If a data base is available for the specific engine, there is no need to halt the combustion process to one of the cylinders and the above mentioned inspections of the phase angle shifts at the $mN_c \pm 2$ terms can be made against the existing database, which thus enables on line monitoring of the engine to be performed.

Practically, when monitoring a real engine, there is no need to actually perform the decomposition of the disturbed waveform into the artificial idealised waveform and the variance waveform. This is because the analysis may be based solely on the harmonic terms of the Fourier series at frequencies which are not at integer orders of the combustion frequency. As was discussed before these harmonic terms for the disturbed waveform provided by the malfunctioning engine, are identical to the corresponding terms of the variance waveform corresponding thereto. Hence the health of the engine may be monitored in a relatively direct manner by analyzing these harmonic terms which are extracted from the Fourier series representation of the disturbed waveform.

Figure 4:
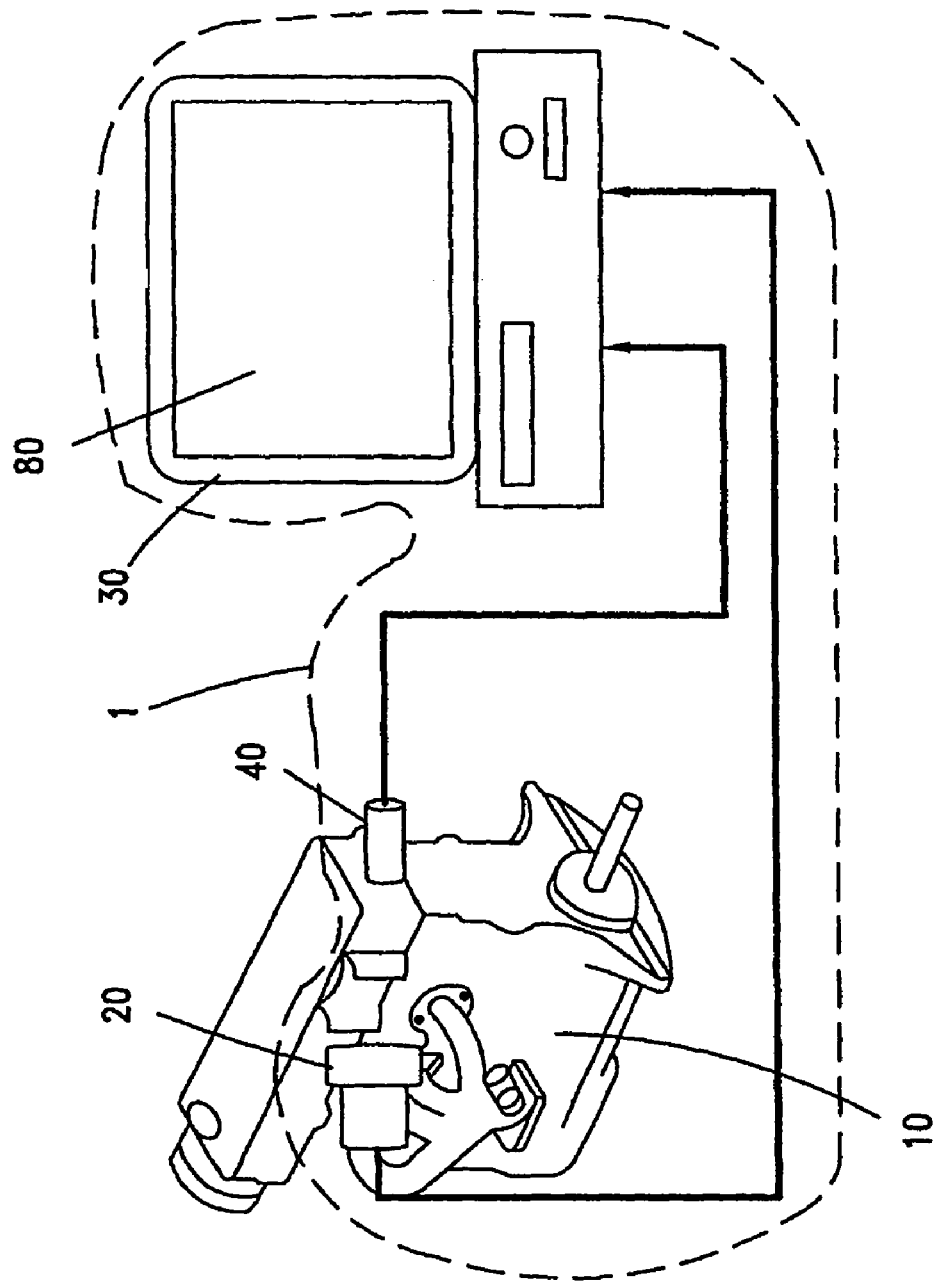
FIG. 4 shows schematically the main elements of the system according to a first embodiment of the present invention.

Thus, the present invention also relates to a system for monitoring the health state of an engine. A preferred embodiment of the system is illustrated in FIG. 4. This embodiment is adapted for enabling the detection of a fault in an engine, in particular for enabling the identification of which cylinder is malfunctioning, and the identification of the nature of the malfunction in the malfunctioning cylinder.

Referring, then, to FIG. 4, the engine to be tested, generally designated by the numeral (10), may be run at any desired running condition. The engine (10) is typically an internal combustion reciprocating engine comprising a plurality of cylinders. Nonetheless, the system (1) and method according to the present invention, are also applicable to other types of piston-based machines and other reciprocating engines in general, including compressors, pumps and so on, and/or rotary engines, such as the Wankel engine, for example, and indeed to any machine that generates vibrations correlated to a periodic thermo-mechanical cycle associated therewith, mutatis mutandis.

The system (1) according to the present invention comprises a vibration sensor (20) and a triggering transducer (40) operatively connected to a suitable microprocessing means such as a computer (30). Of course, more than one vibration sensor (20) may be provided, at any desired choice of locations. The method according to the present invention may thus be applied to the measurements provided from any one of these sensors to provide the best results possible.

Thus, the vibration of the engine (10) is monitored via any suitable sensing means such as a vibration sensor (20) comprised in the system (1). The vibration sensor (20) is typically a transducer such as an accelerometer, velocity transducer, optical or laser based vibration transducer, and so on, that is suitably mounted to the engine (10). The transducer or vibration sensor (20) may be permanently mounted to a predetermined site on the engine block, or alternatively may be positioned there only during data sampling, being held in place with any suitable, temporary fixing means such as magnets or straps, for example.

Preferably, the sensor (20) is mounted on the engine block at the centre thereof and in the vicinity of the crankshaft. The vibration sensor (20) typically generates electrical signals corresponding to the vibration detected, and these signals are transmitted to the suitable microprocessor means such as a computer (30), to which the vibration sensor (20) is operatively connected via a suitable analogue/digital converter.

The system (1) further comprises a second sensor in the form of a triggering transducer (40), or equivalent means, mounted on the engine (10), and also operatively connected to the computer (30), for providing real-time data of the angular disposition of the crankshaft corresponding to the vibration signals received from the vibration sensor (20). The triggering transducer (40) may be mounted onto the engine (10) itself (depending on the type of transducer employed). Alternatively, the triggering transducer is mounted to peripheral components or engine systems such as the fuel distributor, the fuel lines to the cylinders, the spark plug cables, and so on. If a reference database exists for the engine, the triggering transducer (40) is typically mounted at the point where the database was accumulated. The function of the triggering transducer (40) is to enable the synchronisation of the readings obtained from the vibration sensor (20) with the angle of the crankshaft, and may be provided by merely monitoring the voltage in the primary coil line of the engine (10), for example. The computer (30), such as a personal computer or a digital recorder, for example, comprises suitable hardware, such as A/D boards, for example, and suitable software including algorithms that convert the electrical signals obtained from the vibration sensor (20) into a predetermined form of vibration waveform. The computer (30) further enables, where necessary, the electrical signals to be synchronised with the crankshaft angular positional data obtained by means of the second sensor (40). The computer (30) further enables the synchronised vibration data to be transformed to a corresponding Fourier representation by performing a Fast Fourier Analysis (FFT) on this data. Thus, the computer (30) preferably comprises a suitable FFT analyser that provides both the amplitude and the phase angle of the harmonic terms in the frequency domain for the engine (10). The computer (30) thus comprises the suitable hardware and software to enable the accumulation and storage of data from the vibration sensor (20) and the triggering transducer (40) for enabling the numerical procedures associated with the synchronisation of the data and the FFT analysis, as will be described in greater detail hereinbelow. Typically, anti-aliasing filters are comprised in the system (1) to ensure the accuracy of the transformation of the vibration data into the frequency domain as a result of the FFT analysis.

Typically, a once per thermo-mechanical cycle trigger is usually sufficient in terms of the monitoring required from the triggering transducer (40). Finer triggering signals may be required, possibly, if the engine's operation is rough.

The system (1) may be operated according to the method of the present invention as follows, based on the analysis performed hereinbefore, and the system (1), in particular the computer (30), comprises the necessary programming, memory, and display features to accomplish the method.

Thus, the method of monitoring the health of an engine according to the present invention is directed to determining whether or not an imbalance exists between the cylinders in the engine, and comprises the following steps:

1. Providing vibration data for the engine synchronised with respect to the thermo-mechanical cycle of the engine.
2. Transforming the synchronised vibration data into the frequency domain, typically by FFT analysis thereof, to obtain a Fourier representation of the vibration produced by the engine.
3. Monitoring the characteristics of the harmonic components of the Fourier representation at predetermined monitoring frequencies according to first predetermined criteria.
4. Analysing the characteristics of the harmonic components obtained in step 3 according to second predetermined criteria to determine the operational state of the engine correlated to said second criteria.

In a first aspect of the present invention, the operational state of the engine relates to determining whether or not an imbalance exists in a cylinder of said engine. The first criteria relate to monitoring at frequencies which are not at any of the orders of combustion frequency of the engine to provide magnitudes of the harmonic components at these frequencies. The second criteria relate to comparing the magnitudes of harmonic components in step 3 with a predetermined threshold value.

Thus, step 3 comprises (e) monitoring the magnitudes of harmonic components of the Fourier representation at least at one frequency of a first set of monitoring frequencies which is not at any one of the orders of the combustion frequency of the engine;

and step 4 comprises (f) determining whether or not an imbalance exists between the cylinders according to whether the magnitude of the harmonic components obtained in (e) exceeds or not, respectively, at least one predetermined threshold.

Step 1 is typically subdivided into the steps of (a) monitoring the vibration of the engine, typically by means of vibration transducer (20); (b) monitoring the crankshaft angle, typically by means of triggering transducer (40); and (c) synchronising the vibration waveform of (a) with respect to the crankshaft angle obtained in (b).

Thus, according to the method of the present invention, during the operation of the engine (10) the vibration waveform measured by the vibration transducer (20) is accumulated and stored by computer (30). The initial sampling point is clearly identified with respect to the thermo-mechanical cycle of the engine (10). This is important for application of phase analysis for the purpose of identifying the malfunctioning or disordered cylinder of the engine (10). For example, the triggering transducer (40) can be set so that the acquisition process for signals by vibration transducer (20) to provide the wavefrom will begin when the first piston of the engine (10) is at the top dead centre (TDC) during the combustion stroke, and so on. If the triggering transducer (40) provides sufficient signals during a single revolution of the crankshaft of the engine (10), it is possible to trigger the vibration transducer (20) directly so that the vibration readings will be synchronized with the angle of the crankshaft in real time. Alternatively, the signals obtained from the triggering transducer (40) may be accumulated and stored simultaneously with the vibration readings from the vibration transducer (20) for post acquisition synchronization, i.e. for synchronisation with the crankshaft angle at some time after the vibration data has been acquired by means of the vibration transducer (20).

According to the method of the present invention, the vibration waveform is synchronized with the angular velocity (w) of the crankshaft before the FFT analysis may be performed. The synchronization procedure is generally required unless the engine is operating at a uniform angular velocity (cycle to cycle and in-cycle variations are small), in which case the data may be used without synchronisation. Any appropriate type of interpolation between the distinct accumulated vibration readings may be used.

Fast Fourier Transform (FFT) analysis is then used to transform the synchronized vibration data into the frequency domain. Preferably, the FFT analysis is applied on an integral number of thermo-mechanical cycles. The FFT analysis provides a series of harmonics components having specific magnitudes and phase angles for a range of frequencies.

Next, the method of the present invention enables the determination of whether or not the cylinders are balanced and working in a similar manner. This is accomplished by monitoring the magnitudes of harmonic components at least at one frequency of a first set of frequencies which are characterised in not coinciding with orders of the combustion frequency, $f_c$, which is given by the equation:

$$f_c = N_c k f_F \quad (P1)$$

where $k=\frac{1}{2}$ for four-stroke engines and $k=1$ for two-stroke engines. In a four-stroke engines it is further possible to choose monitoring frequencies which are also not at orders of the revolution frequency. In other words, the monitoring frequencies $f^M$ may be chosen such as not to correspond to integer multiples of the revolution frequency $f_F$ for 4-stroke engines, or at the frequency $N_c f_F$ for a 2-stroke engine. This can eliminate interference due to abnormal vibration that might result from mechanical problems associated with the crankshaft (such as mechanical imbalance or misalignment). A few possible values for the monitoring frequencies are listed in Table 1 for different types of engines.

TABLE 1

| Frequencies at which magnitude monitoring may be made | | | | | |
| --- | --- | --- | --- | --- | --- |
| cycle type | $N_c$ | $f_1^M/f_F$ | $f_2^M/f_F$ | $f_3^M/f_F$ | $f_4^M/f_F$ |
| 4 stroke | 4 | 1/2 | 3/2 | 5/2 | 7/2 |
| 4 stroke | 5 | 1/2 | 3/2 | 7/2 | 9/2 |
| 4 stroke | 6 | 1/2 | 3/2 | 5/2 | 7/2 |
| 4 stroke | 8 | 1/2 | 3/2 | 5/2 | 7/2 |
| 2 stroke | 4 | 1 | 2 | 3 | 5 |
| 2 stroke | 6 | 1 | 2 | 3 | 4 |

The first term ($f_1^M$), i.e., the first monitoring frequency of those listed in Table 1, is not generally suitable for monitoring due to severe background noise levels as well as various mechanical excitations that may interfere with the measurements at this frequency.

During normal operation of the engine (10) the magnitude of the harmonic components provided by the FFT analysis of the vibration obtained from the engine (10) at these monitoring frequencies are typically small compared with the magnitude of the corresponding components at orders the combustion frequency. On the other hand, a 10% variation in the combustion pattern in a specific cylinder (in an otherwise orderly operating engine) the expected magnitudes of the harmonic components at frequencies $f_2^M$ and $f^M$ are approximately 2 to 4% of the magnitude of the harmonic component at the combustion frequency. Thus, a threshold R may be established for the magnitude $M_M$ of the harmonic terms at monitoring frequencies with respect to the magnitude $M_c$ of corresponding terms at the combustion frequency. Thus, for values of $M_M/M_c$ less than the threshold value R, the engine is considered to be operating smoothly, while values above this threshold would indicate that an imbalance exists due to a malfunction in one of the cylinders. The value of R may be determined experimentally, and may be fine-tuned according to the tolerance level for imbalance that is acceptable for any particular type of engine considered. Additionally, the values of $M_M/M_c$ or of any other parameter that utilises the values of the terms at the monitoring frequencies may be used to quantify the imbalance of the engine for the purposes of closed loop control, for example.

In a second aspect of the present invention, the method of monitoring the health of an engine according to the present invention may in addition also be directed to identifying the malfunctioning or disordered cylinder in the engine, and is usually conducted once abnormal amplitudes are detected at the monitoring frequencies. The first criteria relate to monitoring at one and preferably at two sets of diagnosing frequencies as defined herein to provide actual phase angles of the harmonic components at these frequencies. The second criteria relate to comparing the phase angles of harmonic components in step 3 with corresponding theoretical absolute phase angles calculated for the same frequencies, for each of the cylinders, and finding the best overall match between the measured and calculated phase angles to identify the imbalanced cylinder.

As such, the method of identifying the malfunctioning cylinder according to the present invention comprises the following steps:

(A) Monitoring the phase angles of harmonic components at least at one first diagnosing frequency, such that the phase angle of the different cylinders are distinct one from another, denoted by $f^D_n$, as will be described further hereinbelow.

(B) Calculating the theoretical absolute phase angle for each of the cylinders of the engine at the at least one first diagnosing frequency, based on a Fourier representation of unbalanced engine vibration.

(C) Determining which is the unbalanced cylinder according to which of the results in step (B) most closely matches the phase angle obtained in step (A).

Of course, the method of identifying the malfunctioning cylinder according to the present invention does not need to follow the detection of abnormal amplitudes at the monitoring frequencies. In other words, the method of identifying the malfunctioning cylinder may be performed independently and directly on an engine, and thus include the steps before step (A):

1. Providing vibration data for the engine synchronised with respect to the thermo-mechanical cycle of the engine.
2. Transforming the synchronised vibration data into the frequency domain, typically by FFT analysis thereof, to obtain a Fourier representation of the vibration produced by the engine.

These steps are identical to the corresponding steps already described hereinbefore with respect to the method for determining whether an imbalance exists in the engine, mutatis mutandis.

The method indicated by steps (A) to (C) are particularly suitable for an engine having an odd number of cylinders or to an engine having an even number of cylinders, but in which it is known whether the imbalance is due to a strong combustion or to a weak combustion in the imbalanced cylinder.

Thus, in step (B), if the engine in question has an odd number of cylinders, the absolute phase angle of each cylinder is calculated assuming that the imbalance is due to a strong combustion therein. Then, a second set of phase angles is calculated assuming that the imbalance is due to a weak combustion in the cylinder, by adding 180° (i.e., $\pi$) to the phase angles of the first set already determined. In step (C), the identity of the unbalanced cylinder is uncovered by determining which of the phase angles in either set most closely resembles the measured phase angle in (A), and this will also reveal whether the combustion is stronger or weaker than in the other cylinders, according to whether the best match was obtained from the first or second sets of phase angles.

Alternatively, the engine has an even number of cylinders, but it is known that the imbalance is due to operating conditions which are stronger than in the other cylinders, typically derived from a strong combustion. In this case, step (B) merely involves determining the phase angles for each of the cylinders, as before, and in step (C) these values are compared to the measured values in (A), the closest match providing the identity of the malfunctioning cylinder. On the other hand, if the engine has an even number of cylinders, but it is known that the imbalance is due from a weak combustion, then in step (B), 180° (i.e., $\pi$) is added to the phase angles for each of the cylinders, and in step (C) these values are compared to the measured values in (A), the closest match providing the identity of the malfunctioning cylinder. In the two latter cases, independent means are generally used to determine whether the combustion is strong or weak, and this may involve, for example, by analysing the real-time fuel consumption rate, or the real-time chemical composition of the exhaust gases of the engine, among others. This method is of course also applicable to engines having an odd number of cylinders, in a similar manner to that described for an engine having an even number of cylinders, mutatis mutandis.

However, due to the ambiguity that may occur in engines having an even number of cylinders, wherein it is not generally known whether the malfunction is due to a strong or weak combustion, the method adopts the following form:

(A) monitoring the phase angles of harmonic components at least at one first diagnosing frequency, $f^D_n$, such that the phase angle of the different cylinders provided thereby; and (D) monitoring the phase angles of harmonic components at least at one second diagnosing frequency, $f^D_n$, such that the phase angle of each cylinder of the engine depends on whether the combustion process in one of the cylinders of a pair of opposing cylinders is stronger or weaker than in the other cylinders;

and followed by calculations steps:

(B) providing, for each cylinder of the engine, a first theoretical absolute phase angle corresponding to said at least one harmonic component of step (A) based on a Fourier representation of unbalanced engine vibration, and a second theoretical absolute phase angle corresponding to said at least one harmonic component of step (A), wherein each said second absolute phase angle is equal to the sum of the corresponding first absolute phase angle and $\pi$ radians;

(E) providing, for each cylinder of the engine, at least one first theoretical absolute phase angle corresponding to said at least one harmonic component of step (D) based on a Fourier representation of unbalanced engine vibration, and a second theoretical absolute phase angle corresponding to said at least one harmonic component of step (D), wherein each said second absolute phase angle is equal to the sum of the corresponding first absolute phase angle and $\pi$ radians;

and then:

(F) determining which is the unbalanced cylinder according to which of the cylinders provides results in step (A) and step (B) that most closely match the phase angles obtained in step (D) and step (E), respectively.

According to the second aspect, the method of the present invention also enables the determination of whether the unbalanced cylinder is operating at a stronger or weaker level than the other cylinders. In the case of an internal combustion engine, this generally corresponds to the combustion process in the unbalanced cylinder being stronger or weaker than in the other cylinders. This determination may be effected as a continuation or part of step (F), since the set of comparisons, i.e., the cylinder that gave the best matches between steps [(A) and (B)] and [(D) and (E)], also identifies the whether the combustion process in the unbalanced cylinder is high or low, respectively, according to whether these best matches were obtained with a corresponding first absolute angle or a corresponding second absolute angle in each of steps (B) and (E). Thus, even for engines having an even number of cylinders, the method according to steps (A), (B), (D), (E), (F) may be applied to identify the unbalanced cylinder, as well as the relative magnitude of the combustion process therein.

Thus, step (A) may be accomplished by first monitoring the phase angle provided by the FFT analysis of the vibration obtained from the engine (10) at least at one frequency of a first set of diagnosing frequencies $f_n^D$, given by $$f_n^D = (mN_c \pm 1)kf_F, \quad (P2)$$

where m is a positive integer (usually m=1,2 are sufficient) and k=½ for four strokes engines and k=1 for 2 strokes engines, as before. Table 2 provides a listing for a few possible values for $f_n^D$ for different types of engines.

TABLE 2

Frequencies at which phase diagnosis can be made

| cycle type | $N_c$ | $f_1^D/f_F$ | $f_2^D/f_F$ | $f_3^D/f_F$ | $f_4^D/f_F$ |
|---|---|---|---|---|---|
| 4 stroke | 4 | 1/2 | 3/2 | 5/2 | 7/2 |
| 4 stroke | 5 | 1/2 | 2 | 3 | 9/2 |
| 4 stroke | 6 | 1/2 | 5/2 | 7/2 | 11/2 |
| 4 stroke | 8 | 1/2 | 7/2 | 9/2 | 15/2 |
| 2 stroke | 4 | 1 | 3 | 5 | 7 |
| 2 stroke | 6 | 1 | 5 | 7 | 11 |

Again, the first term—($f_1^D$)—is not generally suitable for monitoring due to severe background noise levels as well as various mechanical excitations that might interfere with the measurements at this frequency.

However, as already indicated, a distinction between the following two cases should be made (in view of a π radians shift between these two cases):

1. The combustion in the disordered cylinder is stronger than those in the other cylinders.
2. The combustion in the disordered cylinder is weaker than those in the other cylinders.

A distinction between the two cases can be made by monitoring the phase angle provided by the FFT analysis of the vibration obtained from the engine (10) at least at one frequency of a second set of diagnosing frequencies, and examining the phase angle shifts at these frequencies, $f_n^P$, given by $$f_n^P = (mN_c \pm 2)kf_F, \quad (P4)$$

where m is a positive integer (usually m=1,2 are sufficient). A few possible values for $f_n^P$ are listed in Table 3 for different types of engines.

TABLE 3

Frequencies at which distinction between two cases can be made

| Cycle type | $N_c$ | $f_1^P/f_F$ | $f_2^P/f_F$ | $f_3^P/f_F$ |
|---|---|---|---|---|
| 4 stroke | 4 | 1 | 3 | 5 |
| 4 stroke | 6 | 1 | 2 | 4 |
| 4 stroke | 8 | 1 | 3 | 5 |
| 2 stroke | 4 | 2 | 6 | 10 |
| 2 stroke | 6 | 2 | 4 | 8 |

For any pair of opposing cylinders (i.e., a pair of cylinders in which the combustion process in one of the cylinders occurs half a thermo-mechanical cycle before or after the combustion process of the other cylinder) the phase angle shift at these frequencies will depend only on whether the engine's state of operation conforms with case 1 or case 2. Thus, the phase angle of a pair of opposing cylinders will be identical in case 1, and shifted by 180° in case 2. Thus, once a pair of opposing cylinders is identified, via the phase angle at the first diagnosis frequencies ($f_n^D$), as the possible source for the imbalance, the identification of the specific disordered cylinder can be made by testing the phase angle at the second diagnosing frequencies $f_n^P$. It is noted that since the first term ($f_1^P$) in Table 3 is equal to the revolution frequency of four stroke engines it is not recommended for monitoring in these cases. This is because mechanical imbalance of the crankshaft may alter the phase angle that results from the imbalanced combustion processes in the cylinders.

The overall phase angle is measured from the point where the initial trigger was acquired. The initial trigger must be acquired at a fixed point relative to the thermo-mechanical cycle of the engine. It can be taken from a specific tooth on the flywheel or from another mechanical unit which continuously rotates synchronously with the crankshaft. Alternatively, the triggering can be obtained from the fuel injection system, from the ignition system or from any other electrical or mechanical system, as long as the injection shots, the ignition pulses and so forth are synchronised with the thermo-mechanical cycle.

Thus, if the waveform is measured $2\pi(z_{100}/T_h)$ radians before the point where the first cylinder (in the combustion sequence) attains its maximal pressure (typically at TDC) the absolute phase angle corresponding to phase angle of the n-th term in the Fourier series expansion will be $$\phi_n = -2n\pi(z_4/T_h) \quad (P5)$$

In particular it is noted that whenever the phase angle is measured in terms of the crankshaft angle $\phi_s$, $$\phi_n = -nk\phi_s. \quad (P6)$$

Another way to determine the absolute phase angle is by considering the phase angle of the harmonic term at the combustion frequency. The relation between $\phi_c$, the phase angle measured at the combustion frequency, and the phase angle at the n-th term is $$\phi_n = nk(\phi_c/2). \quad (P7)$$

Once the absolute phase angle is determined, the absolute phase angle for the M-th cylinder $\phi_n^M$ is determined via the relation $$\phi_n^M = \phi_n - 2n\pi\left(\frac{M-1}{N_c}\right). \quad (P8)$$

where M=1,2, ..., $N_c$. The phase angle $\phi_n^M$ should have been equal to the phase angle of the n-th term in the measured data if the combustion in the M-th cylinder was stronger than the ones occurring in the other cylinders. If, on the other hand the combustion in the M-th cylinder is weaker than the rest, the absolute phase angle should have been shifted by π radians, that is $$\phi_n^M = \phi_n - 2n\pi\left(\frac{M-1}{N_c}\right) + \pi. \quad (P9)$$

It should be noted that according to equations (P8) and (P9) the values of $\phi_n^M$ may lay outside the interval −π and π. The values of $\phi_n^M$ in this range (−π and π) can be determined by subtracting or adding the term 2π an appropriate number of times as necessary.

A comparison of the phase angles determined via equations (P8) and (P9) with the corresponding phase angles obtained at frequencies $f_n^D$ (from equation P2) and $f_n^P$ (from equation P4) of the Fourier series expansion (FFT) of the measured waveform will provide immediate identification of the disordered cylinder together with the information weather the combustion in this cylinder is stronger or weaker than the ones in the other cylinders.

Typically, the angles obtained from the Fourier series expansion (FFT) of the measured waveform will not match exactly either one of the corresponding angles determined via equations (P8) and (P9). Rather, the identity of the disordered cylinder may be determined according to whichever one of two sets of angles provides the best fit. A method of least-squares fit or any other appropriate method can be used to verify the best correlation between the two sets of phase angles.

Thus, the basic method for monitoring an imbalanced operational state of the engine and to detect the disordered cylinder described hereinabove can be utilized without any prior knowledge regarding the engine except the combustion sequence. In such a case, the cylinders are imbalanced whenever the magnitudes of the terms at the monitoring frequencies ($f_n^M$) exceed a threshold level of about 5%, say, of the magnitude of the harmonic term at the combustion frequency, according to the present invention. The method also allows to distinguish the disordered cylinder and to identify whether the combustion in that cylinder is stronger or weaker than the ones in the other cylinders. However, without an existing prior data base the precise nature or the reason for the malfunction can not be identified and the severity of the problem can not be accurately quantified.

Optionally, and preferably, the method of the present invention further comprises the step of comparing the amplitude and phase angle of the harmonics provided by the FFT analysis of the vibration obtained from the engine (10) at least at one of a fourth set of predetermined monitoring frequencies, with corresponding data of a previously compiled database, and determining the specific malfunction in the unbalanced cylinder according to which of the data in the database most closely matches that of the harmonics provided from the engine under test.

Thus, a reference data base can be constructed for each type of engine to further improve the reliability and accuracy and to fine-tune the method of the present invention. Such a data base can provide further information regarding the type of the malfunction in addition to the general information regarding the strong/weak combustion in the disordered cylinder. A reference data base can be constructed for different types of malfunctions and comparison of these harmonic terms obtained with a test engine against the data base can provide at least an indication regarding the type of the malfunction.

The simplest data base for this purpose may contain only the vibration signature of the engine while running at normal operation conditions at ideal speed and without load. Such a data base should include the magnitudes and the phase angles of the first few terms of the Fourier series of the vibrations waveform (up to 10 terms may be sufficient). The database should be acquired in a manner which is identical to the one that is to be used for the monitoring and diagnosis stages that will be used for testing the engines. Thus, for constructing the database, vibration and triggering transducers should be used, the waveform should be synchronized appropriately, and only then the transformation to the frequency domain should be applied via a fast Fourier procedure.

Each part of the data base should not be based on a single measurement but should rather be averaged from data accumulated from a few measurements and preferably from a few engines of the same type (in case the database is accumulated for use not with a single particular engine but with a plurality of engines of the same model and type). Preferably, the averaging process is made in the frequency domain. Further statistical information such as the standard deviation may also be useful for assessing the severity of the problem.

With such a reference data base a refined threshold level for identifying a state of imbalance between the cylinders can be set since the magnitudes of the monitoring frequencies at normal operating conditions are known. Thus, for example, a threshold level of twice the magnitudes at normal conditions (of the terms at the monitoring frequencies) or, alternatively, a threshold level which is equal to the sum of the magnitudes at normal conditions and three times the standard deviation can be used. The threshold can be set individually for each term or an RMS of some or all of these terms can be set. Once abnormal magnitudes at the monitoring frequencies are discovered the phase angles can be compared against the reference phase angles to assert the fact that indeed the phase angles are shifted from their ordered state.

An important consideration when preparing or using a reference data base is that any given data set can be compared against a reference database if and only if the two data sets were accumulated at the same location and along the same direction and under similar operating conditions. For example small variations in the direction of an accelerometer transducer could result in relatively large variations in the magnitude of the measured vibrations. If the phase angles are also compared between the two sets it is of course important that the initial triggering will be measured from the same point relative to the thermo-mechanical cycle of the engine. If the mounting arrangement of the monitored engine is substantially different from that used in the engines from which the reference database was taken, the vibration signatures may be different even if the two engines are operating under similar working conditions.

More complicated databases can be constructed for different operating conditions of the engine. The databases may be accumulated in a manner similar to the one described above for the simple database, mutatis mutandis. However, the reference database can include the required information for vibrations signatures while the engine is operating at different speeds and under variety of loads. Such databases can be advantageously used, for example, for on-line monitoring of the engine during steady state or transient conditions. Thus the appropriate units for on-line monitoring can be mounted on the engine and the magnitudes and the phase angles of the engine can be continuously computed and compared with the reference database to obtain regular indication regarding the operational state of the engine. Further, such an on-line monitoring sequence can be used, for example, as a part in a control loop that controls the amount fuel that flows to a particular cylinder. For example, if a state of low combustion in one of the cylinders is encountered, a supplementary amount of fuel can be added to this cylinder to even the imbalance between the cylinders.

An even more comprehensive databases can include the required information for vibrations signatures while the engine is operating with artificially applied malfunctions. In addition to the information that is gathered via the comparison with the more simple databases, the usage of this database can provide in-depth information regarding the nature of the malfunction. For example, if a record for a state of operation in which one of the injectors is worn out or the timing of the valves for one of the cylinders is shifted is included in the database, by comparing the magnitudes and phase angles of the terms at the monitoring frequencies these specific malfunctions can be identified online and without any need for additional tests or disassembling of engine parts. The severity of the problem, relative to the reference state, can be asserted as well. A discussion regarding the reliability, consistency and persistency of such databases can be found in deBotton et al. [deBotton, G., Ben-Ari, J. and Sher, E. (2000). Vibrations Monitoring as a Predictive Maintenance Tool for Reciprocating Engines. *Proc. Instn. Mech. Engs.* 214 D, 895–903].

According to the present invention, the phase difference parameter, and indeed any other relevant or desired data may be displayed via display (80) of the system (1), and may comprise any suitable monitor or printer, for example, and/or a visual/sonic alarm system (including, for example, a warning light and/or a siren, respectively) to simply alert that the engine (10) has a fault.

Optionally, the method of the present invention may be applied periodically to an engine (10) during its service life, at periods determined by economic and other factors specific to the application of the engine, thereby providing a predictive maintenance testing cycle.

In the case of an automobile engine for example, using an independent, stand-alone system (1) according to the present invention, the intervals could correspond to the times when the vehicle is in the service station for over-haul engine maintenance treatments, which could be at regular intervals such as every six-months, or could be at intervals that are a function of mileage (distance traveled between treatments), or, perhaps, the earlier of the two.

Alternatively, particularly for new, quality automobile engines, for example, the diagnostic system according to the present invention may be incorporated into the engine, in particular the engine control system itself either as part of an open or a closed control loop. The vibration signature corresponding to the current state of engine could be acquired a short period after the engine is first switched on, each time that the engine is switched on. Alternatively, the data could be collected once a day, once a week, or other convenient time-interval. Alternatively, the monitoring frequency could be a function of mileage or petrol consumption, more accurately reflecting engine usage. The system according to the present invention may also be incorporated into the control system of the engine to assist in maintaining smoothness of operation and/or reduce fuel consumption, and in such cases the monitoring frequency should be accordingly sufficiently high.

The data obtained at each sampling period, can be analysed according to the method of the present invention, and may also be compared with previously obtained data and/or an independent database compiled by the manufacturer of the engine, for example. The comparison with past data may provide trends as to the possibility of a fault occurring in any one of the cylinders, and may even provide predictions as to when such a fault may reach the threshold level corresponding to (R) by applying suitable correlations to the data. The display of suitable warning lights on the car dashboard or a similar signal, including an appropriate computer display, may be adapted to indicate that the car should be taken in to a service center as soon as convenient, or that such action is imperative and urgently required, or that such action should be expected to become necessary within the next time period, as determined by the computer according to correlations between past data and current data. In such an application, the accumulated data could optionally be stored for retrieval and analysis by a more powerful computer at the service station and/or for incorporation into an expanding database for general use.

EXAMPLE

Ford Champion Diesel Engine (2.5 L)

Experimental Set-up

Vibration waveforms of a four stroke Ford Champion diesel engine were measured under various operating conditions. While the engine was not a brand new engine it was well maintained and in good condition. The acceleration transducer was mounted on the engine block and the acquired data was filtered with an antialiasing filter. A once per thermo-mechanical cycle trigger was obtained with a strain-gauge mounted on the fuel line from the primary fuel pump to the 3-rd cylinder. The combustion order of the engine is 3-1-2-4 and thus, in the following analysis, cylinder 3 is denoted as the first in the combustion sequence, cylinder 1 as the second one in the sequence and so forth.

Synchronization Sequence and FFT

After the vibration data was acquired, the time interval between two consecutive fuel injections was divided into a fixed number of equally spaced sub-intervals. By application of a simple interpolation procedure, the magnitude of the vibration at these equally spaced sub-intervals was determined from the data measured with the accelerometer. FFT analysis was finally-applied to this synchronized set of data to obtain the magnitude and the phase angles of the harmonic terms in the frequency domain. A total of 32 thermo-mechanical cycles were used to determine a single vibration spectrum, and four consecutive spectra were averaged in order to minimize the amount of noise.

Monitoring Sequence

During the operation of the engine the magnitudes and phase angles of the harmonic terms at orders 3/2, 2, 5/2 and 3 times the revolution frequency were monitored. These correspond to orders 3, 4, 5 and 6 of the thermo-mechanical frequency. The terms at orders 3 and 5 may regarded as first diagnosis frequencies, $f^D_n$, the term at the 4-th order is the one at the combustion frequency and the term at order 6 provides the required distinction between the cases of strong and the weak combustion in a disordered cylinder (i.e., at a second diagnostic frequency $f^D_n$).

The magnitudes and phase angles that were determined at the above four frequencies are summarized in Table 4 for seven different operating conditions. The amplitudes are normalized by the amplitude of the term at the combustion frequency and the phase angles are given in degrees. The normal condition corresponds to engine operation with no malfunction in the engine. The "loosened injector" cases each correspond to untightening of the appropriate fuel injectors by 2 revolutions, and there was no pressure discharge from the cylinder head through the loosened injectors during running of the engine under these artificially induced malfunctions. In the "disconnected injector" case the fuel line was disconnected from the injector while it is still in its place. In the last case tested, the injectors in cylinders 1, 2 and 3 only were slightly untightened to simulate the case where the combustion process in cylinder 4 is stronger than the combustion processes in the rest of the cylinders.

TABLE 4

Amplitudes and phase angles measured at seven different operating conditions

| operating condition | 3 | | 4 | | 5 | | 6 | |
|---|---|---|---|---|---|---|---|---|
| | Mag. | Phase | Mag. | Phase | Mag. | Phase | Mag. | Phase |
| Normal | 2.34 | 102 | 100 | −88 | 0.24 | −63 | 0.99 | 46 |
| Loosened injector 1 | 6.90 | 120 | 100 | −88 | 1.87 | 98 | 2.23 | 70 |
| Loosened injector 2 | 5.77 | −160 | 100 | −85 | 2.58 | 5 | 1.31 | −98 |
| Loosened injector 3 | 3.99 | −31 | 100 | −85 | 2.30 | −77 | 2.31 | 73 |
| Loosened injector 4 | 7.73 | 45 | 100 | −86 | 2.46 | −164 | 1.01 | −95 |
| Disconnected injector 2 | 17.2 | −158 | 100 | −81 | 4.65 | −10 | 3.23 | −92 |
| Loosened injectors 1, 2 and 3 | 5.79 | −96 | 100 | −85 | 3.12 | −44 | 1.60 | 70 |

It is evident that the amplitudes at orders 3 and 5 severely increase when the combustion in one of the cylinders differ from the ones at the other cylinders. At the third order term a threshold level of about 4% of the amplitude at combustion frequency is sufficient to distinguish an imbalanced state of operation from normal operating conditions. A corresponding threshold level of 1% at the fifth order term can provide corroboration. The correlation between the magnitude of the harmonic terms at these frequencies and the severity of the malfunction is also evident from Table 4.

Diagnosis Sequence

The absolute phase angle of the engine can be determined from the knowledge that the in diesel engines the injection pulse occurs approximately at $\phi_s=35°$ before the combustion attains its maximal magnitude. From equation (P6) we can determine that the absolute phase angle is $\phi_n = -17.5n$ Alternatively, we may use the measurements for the phase angles measured at the combustion frequency (equation P7), to obtain $\phi_n \approx n(-85/4)$.

From equations (P8) and (P9) the absolute phase angles for the four cylinders can be approximated for the two cases of strong and weak combustion in the disordered cylinder, and these are summarized in Table 5 for the three frequencies corresponding to 3, 5 and 6 times the fundamental frequency. In Table 5 the absolute phase angle was based on the relation obtained from equation (P7). The corresponding values of the angles in the range between (−180° and 180°) are shown.

TABLE 5

Absolute phase angles at three pertinent frequencies for the four cylinders

| | strong | | | weak | | |
|---|---|---|---|---|---|---|
| Cylinder # | 3 | 5 | 6 | 3 | 5 | 6 |
| 1 | −64 | −106 | −127 | 116 | 74 | 53 |
| 2 | 26 | 164 | 53 | −154 | −16 | −127 |
| 3 | 116 | 74 | −127 | −64 | −106 | 53 |
| 4 | −154 | −16 | 53 | 26 | 164 | −127 |

Comparison of the absolute phase angles with the corresponding measured phase angles for the first malfunction in Table 4 (loosed injector 1) is carried out in Table 6, in which the measured angles of Table 4 are subtracted from the corresponding absolute phase angles determined in Table 5.

TABLE 6

Comparison between the absolute phase angles and the measured angles

| | strong | | | weak | | |
|---|---|---|---|---|---|---|
| Cylinder # | 3 | 5 | 6 | 3 | 5 | 6 |
| 1 | 176 | 156 | 163 | −4 | −24 | −17 |
| 2 | −94 | 66 | −17 | 86 | −114 | 163 |
| 3 | −4 | −24 | 163 | 176 | 156 | −17 |
| 4 | 86 | −114 | −17 | −94 | 66 | 163 |

It is evident from Table 6 that the magnitude of the difference (i.e., regardless of whether the difference is positive or negative) between absolute phase angle and the measured angle corresponding to a weak combustion in cylinder 1 is the smallest, thereby indicating that this cylinder is the source for the imbalance.

Any suitable averaging method, preferably a simple least-squares fit (root mean square—RMS), can be applied to the phase differences of Table 6 to obtain a single measure indicating directly the disordered cylinder. The summary of this simple form for measuring the correlation between the measured phase angles and the absolute phase angles is shown in Table 7 for the six abnormal operating conditions listed in Table 4.

TABLE 7

RMS correlation between absolute phase angles and the measured angles

| Operating Condition | 1 | | 2 | | 3 | | 4 | |
|---|---|---|---|---|---|---|---|---|
| | strong | weak | strong | weak | strong | weak | strong | weak |
| Loosened injector 1 | 165 | 17 | 67 | 125 | 95 | 136 | 83 | 115 |
| Loosened injector 2 | 87 | 107 | 161 | 21 | 64 | 121 | 88 | 137 |
| Loosened injector 3 | 96 | 122 | 77 | 121 | 153 | 28 | 80 | 120 |
| Loosened injector 4 | 74 | 118 | 88 | 128 | 84 | 111 | 152 | 29 |
| Disconnected injector 2 | 80 | 108 | 165 | 21 | 72 | 114 | 84 | 144 |
| Loosened injectors 1, 2, 3 | 102 | 110 | 113 | 101 | 144 | 48 | 38 | 147 |

It can be seen that the simple method for correlating the results provided a single measure that provides accurate identification of the disordered cylinder.

While in the foregoing description describes in detail only a few specific embodiments of the invention, it will be understood by those skilled in the art that the invention is not limited thereto and that other variations in form and details may be possible without departing from the scope and spirit of the invention herein disclosed.

The invention claimed is:

1. A method for diagnosing an operational state of an engine comprising the steps of:
   (a) providing vibration data from the engine, said data synchronised with respect to the thermo-mechanical cycle of the engine;
   (b) transforming the synchronised vibration data in (a) into the frequency domain to obtain a Fourier representation of the vibration produced by the engine;
   (c) monitoring the characteristics of the harmonic components of the Fourier representation at least at one predetermined frequency, wherein said predetermined frequency is predetermined according to at least one first predetermined criterion;
   (d) analysing the characteristics of the harmonic components obtained in step (c) according to at least one second predetermined criterion to determine the operational state of the engine correlated to said second criterion.

2. A method as claimed in claim 1, wherein said operational state of the engine correlated to said second predetermined criteria relates to determining whether or nor an imbalance exists in a cylinder of said engine, wherein step (c) comprises
   (e) monitoring the magnitudes of harmonic components of the Fourier representation at least at one frequency of a first set of monitoring frequencies which is not at any one of the orders of the combustion frequency of the engine;
   and wherein step (d) comprises
   (f) determining whether or not an imbalance exists between the cylinders according to whether the magnitude of the harmonic components obtained in (e) exceeds or not, respectively, at least one predetermined threshold.

3. A method as claimed in claim 1, wherein step (a) comprises the substeps:
   (i) monitoring the vibration of the engine;
   (ii) monitoring the revolution angle of the engine; and
   (iii) synchronising the vibration waveform of (i) with respect to the revolution angle obtained in (ii).

4. A method as claimed in claim 3, wherein step (i) is accomplished by means of a suitable vibration transducer operatively connected to the said engine.

5. A method as claimed in claim 4, wherein said revolution angle is determined by means of a second, triggering transducer, operatively connected to the crankshaft of said engine.

6. A method as claimed in claim 1, wherein step (b) is accomplished by applying a Fast Fourier Transform (FFT) analysis to the vibration data obtained in step (a).

7. A method as claimed in claim 2, wherein said combustion frequency is given by the expression:

$$f_c = N_c k f_F$$

wherein:
   $k = \frac{1}{2}$ for four-stroke engines and $k=1$ for two-stroke engines;

$N_c$ is the number of cylinders in the engine; and
   $f_F$ is the revolution frequency of the engine.

8. A method as claimed in claim 2, wherein said threshold is in the range of between about 1% and about 4% of the magnitude of the corresponding harmonic components of the Fourier representation at any order of the combustion frequency of the engine.

9. A method as claimed in claim 8, wherein said threshold is in the range of between about 1% and about 4% of the magnitude of the of the corresponding harmonic components of the Fourier representation at the combustion frequency of the engine.

10. A method as claimed to claim 1, wherein said operational state of the engine correlated to said second predetermined criteria relates to identifying an unbalanced cylinder of said engine, wherein step (c) comprises:
    (A) monitoring the phase angles of harmonic components at least at one first diagnosing frequency, $f^D_n$, such that the phase angle of the different cylinders provided thereby;
    and step (d) comprises:
    (B) providing, for each cylinder of the engine, at least one first theoretical absolute phase angle corresponding to said at least one harmonic component of step (A) based on a Fourier representation of unbalanced engine vibration; and
    (C) determining which is the unbalanced cylinder according to which of the cylinders provides results in step (B) that most closely matches the phase angle obtained in step (A).

11. A method as claimed in claim 10, wherein the said engine comprises an odd number of cylinders, and wherein in step (B) further comprises providing for each said cylinder a second theoretical absolute phase angle corresponding to said at least one harmonic component of step (A), wherein each said second absolute phase angle is equal to the sum of the corresponding first absolute phase angle and $\pi$ radians.

12. A method as claimed in claim 11, wherein it is determined whether the unbalanced cylinder is operating at a stronger or weaker level than the other cylinders according to whether the determination of step (C) is provided from results obtained at the said first absolute phase angles or at the said second absolute phase angles.

13. A method as claimed in claim 10, wherein the said engine comprises an even number of cylinders, and wherein it is known that the unbalanced cylinder is operating at a stronger level than the other cylinders in the engine.

14. A method as claimed in claim 10, wherein the said engine comprises an even number of cylinders, and wherein it is known that the unbalanced cylinder is operating at a weaker level than the other cylinders in the engine, and wherein step (B) further comprises adding the value of $\pi$ radians to each said first theoretical absolute phase angle corresponding to said at least one harmonic component of step (A), prior to executing step (C).

15. A method as claimed in claim 1, wherein said operational state of the engine correlated to said second predetermined criteria relates to identifying an unbalanced cylinder of said engine, wherein step (c) comprises
    (A) monitoring the phase angles of harmonic components at least at one first diagnosing frequency, $f^D_n$, such that the phase angle of the different cylinders provided thereby; and
    (D) monitoring the phase angles of harmonic components at least at one second diagnosing frequency, $f^P_n$, such that the phase angle of each cylinder of the engine depends on whether the combustion process in one of the cylinders of a pair of opposing cylinders is stronger or weaker than in the other cylinders;

and step (d) comprises:
(B) providing, for each cylinder of the engine, a first theoretical absolute phase angle corresponding to said at least one harmonic component of step (A) based on a Fourier representation of unbalanced engine vibration, and a second theoretical absolute phase angle corresponding to said at least one harmonic component of step (A), wherein each said second absolute phase angle is equal to the sum of the corresponding first absolute phase angle and it radians;
(E) providing, for each cylinder of the engine, at least one first theoretical absolute phase angle corresponding to said at least one harmonic component of step (D) based on a Fourier representation of unbalanced engine vibration, and a second theoretical absolute phase angle corresponding to said at least one harmonic component of step (D), wherein each said second absolute phase angle is equal to the sum of the corresponding first absolute phase angle and $\pi$ radians; and
(F) determining which is the unbalanced cylinder according to which of the cylinders provides results in step (A) and step (B) that most closely matches the phase angle obtained in step (D) and step (E), respectively.

16. A method as claimed in any one of claims 10 to 15, wherein said at least one frequency of a first set of diagnosing frequencies $f_n^D$ is given by the expression:

$$f_n^D = (mN_c \pm 1)kf_F$$

wherein:
m is a positive integer
k=½ for four-stroke engines and k=1 for two-stroke engines;
$N_c$ is the number of cylinders in the engine; and
$f_F$ is the revolution frequency of the engine.

17. A method as claimed in any one of claims 10 to 15, wherein said at least one frequency of a second set of diagnosing frequencies, $f_n^P$, is given by the expression:

$$f_n^P = (mN_c \pm 2)kf_F$$

wherein:
m is a positive integer
k=½ for four-stroke engines and k=1 for two-stroke engines;
$N_c$ is the number of cylinders in the engine; and
$f_F$ is the revolution frequency of the engine.

18. A method as claimed in any one of claims 10 to 15, wherein said absolute phase angle $\phi_n^M$ for the M-th cylinder is determined in step (B) via the expression:

$$\phi_n^M = \phi_n - 2n\pi\left(\frac{M-1}{N_c}\right).$$

wherein:
n is the order corresponding to the harmonic in step (A);
$N_c$ is the number of cylinders in the engine;
M=1,2, ..., $N_c$;
$\phi_n$ is the phase angle at the n'th term in the Fourier series representation.

19. A method as claimed in claim 15, wherein said absolute phase angle $\phi_n^M$ for the M-th cylinder is determined in step (E) via the expression:

$$\phi_n^M = \phi_n - 2n\pi\left(\frac{M-1}{N_c}\right) + \pi.$$

wherein:
n is the order corresponding to the harmonic in step (A);
$N_c$ is the number of cylinders in the engine;
M=1,2, ..., $N_c$;
$\phi_n$ is the phase angle at the n'th term in the Fourier series representation.

20. A method as claimed in claim 18, wherein said is the phase angle at the n'th term, $\phi_n$, is provided by the expression $$\phi_n = nk(\phi_c/2).$$

wherein:
n is the order corresponding to the harmonic in step (A);
k=½ for four-stroke engines and k=1 for two-stroke engines;
$\phi_c$ is the phase angle of the harmonic term at the combustion frequency.

21. A method as claimed in claim 15, wherein said predetermined criteria further relates to determining whether the combustion process in the unbalanced cylinder is stronger or weaker than the combustion process in other cylinders of the engine, further comprising the step of:
(G) determining whether the combustion process in the unbalanced cylinder is stronger or weaker than in the other cylinders, according to whether the closest match in step (F) corresponds to a corresponding said first absolute angle or a corresponding second absolute angle in each one of steps (D) and (E).

22. A method according to any one of claims 10 to 15, wherein in step (B), for each of the cylinders of the engine, the theoretical absolute phase angles corresponding to a plurality of harmonic components of step (A) based on a Fourier representation of unbalanced engine vibration is determined, and wherein the resulting set of absolute phase angles corresponding to each of the cylinders is operated on via a mathematical operation to provide a representative absolute phase angle for each corresponding cylinder.

23. A method as claimed in claim 22, wherein said mathematical operation comprises for each cylinder performing a root mean square operation on the corresponding set of phase angles.

24. A method according to claim 15, wherein in step (E), for each of the cylinders of the engine, the theoretical absolute phase angles corresponding to a plurality of harmonic components of step (A) based on a Fourier representation of unbalanced engine vibration is determined, and wherein the resulting set of absolute phase angles corresponding to each cylinder is operated on via a mathematical operation to provide a representative absolute phase angle for each corresponding cylinder.

25. A method as claimed in claim 24, wherein said mathematical operation comprises for each cylinder performing a root mean square operation on the corresponding set of phase angles.

26. A method as claimed in any one of claims 1 to 15, wherein said engine is an internal combustion engine.

27. A method according to any one of claims 2 to 15, wherein a plurality of thresholds are provided in the form of an accessible reference library.

28. A method according to claim 27, wherein each one of said plurality of thresholds corresponds to a particular root cause for unbalanced engine operation.

29. A system for diagnosing the operational state of an engine comprising:
   (a) measuring means for measuring a vibration signature of the engine generated by the engine with respect to the thermo-mechanical cycle of the engine;
   (b) data processing means adapted for:
      (i) transforming the vibration data in (a), after normalisation thereof with respect to the thermo-mechanical cycle of the engine, into the frequency domain to obtain a Fourier representation of the vibration produced by the engine;
      (ii) monitoring the characteristics of the harmonic components of the Fourier representation at least at one predetermined monitoring frequency according to at least one predetermined first criterion; and
      (iii) comparing the characteristics of the harmonic components obtained in step (ii) with at least one second predetermined criterion to determine the operational state of the engine correlated to said second criterion.

30. A system according to claim 29, wherein step (b) is performed according to the method as defined in any one of claims 1 to 15.

31. A system according to claim 29, wherein step (b) is performed according to the method as defined in any one of claims 16 to 28.

32. A system as claimed in claim 29, wherein said measuring means comprises at least one suitable vibration sensor for measuring the said vibration signature of the engine, and at least one triggering sensor for providing corresponding data relating to the thermo-mechanical cycle of the engine.

33. A system as claimed in claim 29, wherein said data processing means comprises a suitable microprocessor computer operatively connected to said measuring means.

34. A system as claimed in claim 29, further comprising suitable display means operatively connected to said data processing means for displaying the state of health of the engine determined by said data processing means.

* * * * *